US012382944B2

United States Patent
Davis et al.

(10) Patent No.: US 12,382,944 B2
(45) Date of Patent: Aug. 12, 2025

(54) RIGID FUMIGANT BARRIER FOR SHIPPING CONTAINER DOOR

(71) Applicant: ECOLAB USA INC., Saint Paul, MN (US)

(72) Inventors: Danny Davis, Saint Paul, MN (US); Francis Urhahn, Saint Paul, MN (US); Michael Bickel, Saint Paul, MN (US); Nolan Bernard, Saint Paul, MN (US); Richard Smith, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 196 days.

(21) Appl. No.: 18/153,060

(22) Filed: Jan. 11, 2023

(65) Prior Publication Data

US 2023/0217915 A1  Jul. 13, 2023

Related U.S. Application Data

(60) Provisional application No. 63/298,432, filed on Jan. 11, 2022.

(51) Int. Cl.
*B65D 90/00* (2006.01)
*A01M 13/00* (2006.01)
(Continued)

(52) U.S. Cl.
CPC ......... *A01M 13/003* (2013.01); *B65D 88/121* (2013.01); *B65D 88/745* (2013.01); *B65D 90/008* (2013.01)

(58) Field of Classification Search
CPC . A01M 13/003; B65D 88/745; B65D 90/008; A23L 3/3409; A23B 7/144
See application file for complete search history.

(56) References Cited

U.S. PATENT DOCUMENTS 4,936,104 A * 6/1990 Hicke .................. B65D 88/745
62/211
7,908,791 B1 * 3/2011 Brash .................. A01M 13/003
43/125
(Continued)

FOREIGN PATENT DOCUMENTS

BE      1016786 A3 *  6/2007

OTHER PUBLICATIONS

BE1016786A3 translation (Year: 2007).*

*Primary Examiner* — Don M Anderson
(74) *Attorney, Agent, or Firm* — McKee, Voorhees & Sease, PLC

(57) ABSTRACT

A lightweight barrier insert door is attached to an enclosure, such as a shipping container that holds a product to be fumigated, such as during transport of the product to a new location. The barrier insert door fits within the doorway of the container to provide a sealed barrier to mitigate leakage of a fumigant from the interior of the container. The barrier also includes air intake ports to maintain the structural integrity of the container and to provide ambient air to the interior. Additional ports allow for connection for fumigant entry, monitoring, and/or an exhaust hose to be connected to or through the barrier for the fumigation process. The barrier can be height adjustable to account for shipping containers of various sizes and can be connected with fumigant exhaust and release systems for the safe release thereof.

18 Claims, 12 Drawing Sheets

(51) Int. Cl.
*B65D 88/12* (2006.01)
*B65D 88/74* (2006.01)

(56) References Cited

U.S. PATENT DOCUMENTS

| | | | | |
|---|---|---|---|---|
| 8,132,357 | B2 * | 3/2012 | Rogacki | A01M 13/003 |
| | | | | 43/125 |
| 8,656,635 | B1 * | 2/2014 | Rogacki | A01M 13/003 |
| | | | | 43/125 |
| 9,497,955 | B1 * | 11/2016 | Rogacki | A01M 13/003 |
| 9,821,952 | B1 * | 11/2017 | Napoles | A23L 3/3409 |
| 2002/0078661 | A1 * | 6/2002 | Bowden | B65B 11/045 |
| | | | | 206/597 |
| 2007/0163435 | A1 * | 7/2007 | Brash | A23L 3/3409 |
| | | | | 96/108 |
| 2008/0251514 | A1 * | 10/2008 | Fitzpatrick | A23L 3/3409 |
| | | | | 220/86.1 |
| 2012/0247067 | A1 * | 10/2012 | Podd | B65D 88/745 |
| | | | | 53/127 |
| 2013/0040552 | A1 * | 2/2013 | Ivanine | A01M 13/003 |
| | | | | 454/339 |
| 2015/0210460 | A1 * | 7/2015 | Cherry | B65D 88/74 |
| | | | | 206/524.4 |
| 2018/0328643 | A1 * | 11/2018 | Eddy | F25D 11/003 |
| 2020/0340739 | A1 * | 10/2020 | Mardones Soto | F25D 17/04 |

\* cited by examiner

RIGID FUMIGANT BARRIER FOR SHIPPING CONTAINER DOOR

CROSS REFERENCE TO RELATED APPLICATIONS

This application claims priority under 35 U.S.C. § 119 to provisional patent application U.S. Ser. No. 63/298,432, filed Jan. 11, 2022. The provisional patent application is herein incorporated by reference in its entirety, including without limitation, the specification, claims, and abstract, as well as any figures, tables, appendices, or drawings thereof.

FIELD OF THE INVENTION

The invention relates generally to systems, methods, and/or apparatus for treating goods and exhausting emissions. More particularly, but not exclusively, the invention relates to systems, methods, and/or apparatus for controlling the exposure, monitoring, and release of a fumigant gas used to fumigate product held in a container.

BACKGROUND OF THE INVENTION

The background description provided herein gives context for the present disclosure. Work of the presently named inventors, as well as aspects of the description that may not otherwise qualify as prior art at the time of filing, are neither expressly nor impliedly admitted as prior art.

Many products, including, but not limited to, lumber, produce, and the like, are shipped from their point of origin to an import/export location. Because the products are not native to the location of the import/export, it is important to make sure that non-native species, such as non-native flora and fauna, are not introduced to the location. Doing so could upset or otherwise affect the local flora and fauna, which could have many unwanted ramifications.

Therefore, upon transport of the product to the import/export locations, the product may be fumigated or otherwise treated with a gaseous mixture to effectively kill any flora or fauna that may have been transported with the product. For example, fumigation is most often accomplished using methyl bromide gas. While many uses of methyl bromide have been curbed by environmental laws, quarantine fumigation of perishable agricultural products, especially fresh fruit, will continue into the future.

Fumigation is accomplished by sealing the transported product in an enclosure (e.g., shipping containers, tarped sealed stacks, rooms, shrouded areas, or the like) and filling the enclosure with methyl bromide or like chemical at a sufficient concentration and temperature and for a sufficient period of time to kill any unwanted flora and/or fauna. For example, the enclosure for logs or lumber may be a shipping container made of steel and comprising an elongated structure for storing the lumber. The methyl bromide is added to the interior and the lumber is exposed thereto for a sufficient amount of time for the fumigant to kill any unwanted flora and/or fauna.

However, after the fumigant has been exposed to the product, it must be exhausted from the enclosure in a safe and efficient manner. As the fumigant, such as methyl bromide, can be hazardous to people and/or the environment, it is highly regulated and the addition and exhaust/removal of the fumigant to and from the enclosure is highly controlled. In addition, local and national rules and regulations often control how the removal of the fumigant can be controlled. For example, the release of the fumigant can be controlled by a chimney, such as that disclosed in U.S. Ser. No. 17/457,487, hereby incorporated by reference in its entirety.

Thus, it is important to provide a connection between the interior and exterior of an enclosure used for fumigating product, and also to provide a connection to an external exhaust system for the fumigant. This may need to be compatible with existing shipping enclosures, such as steel shipping containers.

While there are doors that exist that can be connected and used with a shipping container, they are insufficient for their purpose. For example, the doors are much too heavy and difficult to use, do not include ports for monitoring and evaluating the system, and otherwise allow for leakage of the fumigant. In addition, the doors block or obstruct the normal operation and components of the shipping container, affecting the structural integrity thereof.

Thus, there exists a need in the art for a system and/or apparatus for creating a barrier to mitigate fumigant loss from an enclosure during active aeration of a product, and also providing a way to exhaust the fumigant upon completion of the fumigation.

SUMMARY OF THE INVENTION

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the invention to improve on or overcome the deficiencies in the art.

It is a further object, feature, and/or advantage of aspects and/or embodiments of the present disclosure to provide a lightweight, flexible barrier for use with a container used during the fumigation of a product.

It is still yet a further object, feature, and/or advantage of aspects and/or embodiments of the present disclosure to provide a barrier for use in the fumigation of a product that allows for the introduction of and removal of fumigant relative to a container containing the product.

It is another object, feature, and/or advantage of aspects and/or embodiments of the present disclosure to provide a barrier for use with a shipping container that allows the container doors to be closed over the barrier.

It is still another object, feature, and/or advantage of aspects and/or embodiments of the present disclosure to provide an insertable barrier for fumigation via a container that provides a sealed barrier and a one-way introduction of fresh air.

It is yet another object, feature, and/or advantage of aspects and/or embodiments of the present disclosure to provide a barrier for use in the fumigation of product in a container that is size-adjustable in height and/or width to allow for the use of the barrier with a variety of containers and container openings.

The apparatus disclosed herein can be used in a wide variety of applications. For example, the barrier as disclosed herein can be used with a number and variety of types and sizes of containers used in the fumigation of a product held therein. The apparatus could be used in a number of locations to be adjustable to comply with any number of rules and/or regulations.

It is preferred the apparatus be safe, cost effective, and durable. For example, the sealing of the barrier will comply with regulations to mitigate leaking of a fumigant, while also being compliant with an exhaust system to provide for the controlled exhaustion of the fumigant from the container.

At least one embodiment disclosed herein comprises a distinct aesthetic appearance. Ornamental aspects included in such an embodiment can help capture a consumer's attention and/or identify a source of origin of a product being sold. Said ornamental aspects will not impede functionality of the invention.

Methods can be practiced which facilitate use, manufacture, assembly, maintenance, and repair of [an apparatus] which accomplish some or all of the previously stated objectives.

According to at least some aspects and/or embodiments of the present disclosure, a barrier insert for use with a container used for fumigation of a product held inside comprises a barrier insert body; at least one air intake port at an upper position of the barrier insert body, said air intake port comprising a one-way flap to allow air to enter into the container via the port; at least one grommet for allowing the entry of one or more lines into the container; and a connection flange for connecting an exhaust tube to the barrier insert.

According to at least some aspects of some embodiments, the insert includes a seal around the edges of the barrier insert body.

According to at least some aspects of some embodiments, the seal comprises a gasket.

According to at least some aspects of some embodiments, the insert includes a plurality of side hooks for attaching the insert to the container.

According to at least some aspects of some embodiments, the flap of the at least one air intake port is connected to the barrier insert body via a hinge.

According to at least some aspects of some embodiments, the flap comprises the same material as the barrier insert body.

According to at least some aspects of some embodiments, the barrier insert body comprises a lightweight, three-walled construction.

According to at least some aspects of some embodiments, the three-walled construction comprises three plexiglass walls spaced apart via support members transverse to the walls.

According to at least some aspects of some embodiments, the system further comprises an extension system connected to the barrier insert body to adjust the height of the barrier insert.

According to at least some aspects of some embodiments, the extension system comprises an extension connected to the barrier insert body via a hinge and held in longitudinal configuration by one or more locking members.

According to additional aspects and/or embodiments of the disclosure a barrier system for use fumigating a product in a shipping container comprises a barrier insert comprising a barrier insert body, at least one air intake port at an upper position of the barrier insert body, said air intake port comprising a one-way flap to allow air to enter into the container via the port; a fumigant introduction line grommet through the barrier insert body to receive a fumigant introduction line for adding fumigant to the container; and a connection flange for connecting an exhaust tube to the barrier insert.

According to at least some aspects of some embodiments, the system further comprises at least one monitoring line grommet to receive a monitoring line through the barrier insert.

According to at least some aspects of some embodiments, the system further comprises one or more side hooks for connecting the barrier insert to a doorway of the shipping container.

According to at least some aspects of some embodiments, the barrier insert includes a gasket around a top and a first and second side edge of the barrier insert body.

According to at least some aspects of some embodiments, the system further comprises a rubber brush gasket at a bottom of the barrier insert body.

According to at least some aspects of some embodiments, the system further comprises an extension system connected to the barrier insert body to adjust the height of the barrier insert.

According to at least some aspects of some embodiments, the extension system comprises an extension connected to the barrier insert body via a hinge and held in longitudinal configuration by one or more locking members.

According to still additional aspects and/or embodiments of the present disclosure, a barrier insert door comprises a barrier insert body comprising a three-walled construction, said barrier insert body including a gasket around a top, a first, and second side edge, and a rubber brush gasket along a bottom; at least one air intake port at an upper position of the barrier insert body, said air intake port comprising a one-way flap to allow air to enter into the container via the port; and an extension system connected to the barrier insert body to adjust the height of the barrier insert.

According to at least some aspects of some embodiments, the extension system comprises an extension connected to the barrier insert body via a hinge and held in longitudinal configuration by one or more locking members.

According to at least some aspects of some embodiments, the insert door further comprises one or more grommets for allowing one or more lines to pass through the barrier insert body, and a connection flange for connecting an exhaust conduit to the barrier insert door.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

BRIEF DESCRIPTION OF THE DRAWINGS

Several embodiments in which the invention can be practiced are illustrated and described in detail, wherein like reference characters represent like components throughout the several views. The drawings are presented for exemplary purposes and may not be to scale unless otherwise indicated.

Figure 1:
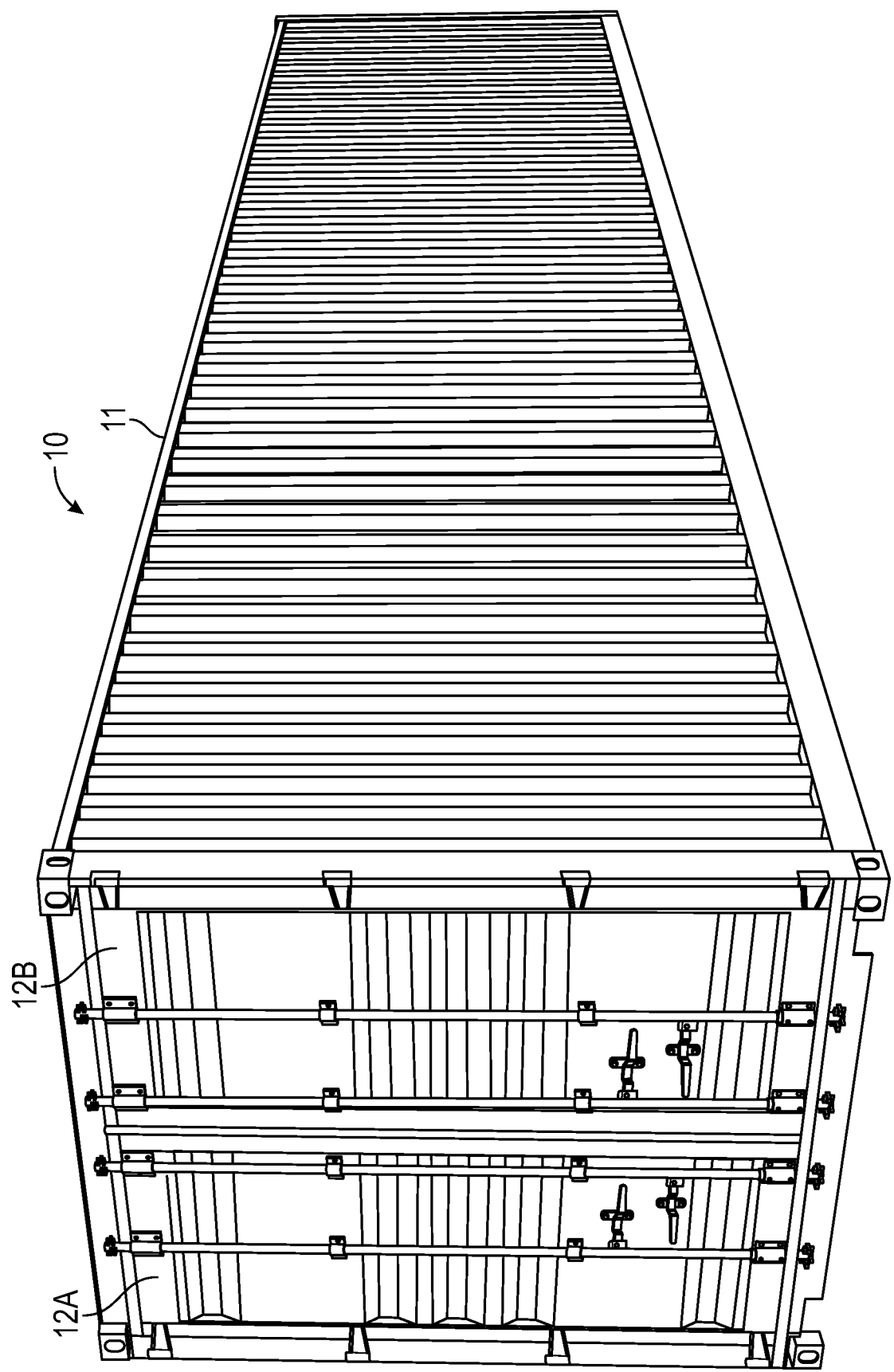
FIG. 1 is a depiction of an exemplary shipping container.

An artisan of ordinary skill in the art need not view, within isolated figure(s), the near infinite distinct combinations of features described in the following detailed description to facilitate an understanding of the present disclosure.

DETAILED DESCRIPTION OF THE INVENTION

The present disclosure is not to be limited to that described herein. Mechanical, electrical, chemical, procedural, and/or other changes can be made without departing from the spirit and scope of the invention. No features shown or described are essential to permit basic operation of the invention unless otherwise indicated.

Unless defined otherwise, all technical and scientific terms used above have the same meaning as commonly understood by one of ordinary skill in the art to which embodiments of the invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein refer to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The "scope" of the invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

As stated in U.S. Pat. No. 7,435,378, which is hereby incorporated by reference in its entirety, it is important and/or legally required to fumigate commodities and other goods that are imported into one country from another to kill pests that are not native to the receiving country and that therefore pose a threat to its agriculture. For example, fumigation was most often accomplished using methyl bromide gas. While many uses of methyl bromide have been curbed by environmental laws, quarantine fumigation of perishable agricultural products, especially fresh fruit, will continue into the future.

As disclosed in the '378 patent, an apparatus forms a chamber enclosing the goods on a surface and includes a canopy that is substantially impermeable to flowable materials, such as gas, liquid, or a combination thereof. The apparatus further includes an upper perimeter for supporting an upper portion of the canopy; a lower perimeter for supporting a lower portion of the canopy; a support structure for supporting the upper perimeter and lower perimeter; and a gasket in communication with the lower perimeter, the gasket being deformable to substantially seal the chamber by compressing the gasket against the surface. In use, the upper perimeter and lower perimeter are fixedly attached to a support structure via a perimeter support. The apparatus may be moveable with respect to the support structure. The lower perimeter may be raised and compressed against the upper perimeter to provide room to place the goods on the surface, then lowered away from the upper perimeter to be placed in proximity to the surface, thereby forming the chamber. The apparatus may also include an intermediate support structure for providing support to the canopy.

In such a system, the goods are fumigated in an efficient manner. However, according to various local, national, and/or international regulations, the timing of exposure to the goods by the fumigating agent, as well as the release of the fumigating agent from the system and/or apparatus can be tightly controlled. It can be vital that the fumigating agent is not exposed to the goods for too long, but the various regulations may also require the release of the fumigating agent be controlled so as to comply with local, state, federal, and country regulations around the release of fumigant to comply with safety standards such as OSHA, fence line, and other short and long term exposure limits as defined by said bodies.

Therefore, the system as disclosed in U.S. Ser. No. 17/457,487, which is hereby incorporated by reference in its entirety, has been provided as a way to control the release of the fumigant. While the '378 patent and the '487 application disclose a shroud, it should be appreciated that that some products being fumigated (e.g., timber or the like) are typically stored in shipping containers. Instead of moving the timber from the shipping containers to the shrouds for fumigation, a system is connected directly to the container itself to provide the fumigant to the interior of the shipping container to fumigate the products stored therein. Upon completion of the fumigation process, the fumigant then needs to be exhausted from the container in a manner that complies with local, regional, and/or national rules and/or regulations as disclosed by agencies, such as environmental protection agencies.

However, shipping containers such as those used to ship, store, and fumigate products are not generally set up to add and exhaust the fumigant. The containers are generally configured with large doors or removable roofs to allow for quick and easy access to add or remove products, but not necessarily a gaseous product, such as the fumigant. An exemplary shipping container 10 is shown in FIG. 1, which includes an elongated enclosure 11 with one or two rear or back doors 12A and 12B at an end. The doors 12A, 12B may also be referred to as a left back door 12A and a right back door 12B. Therefore, as will be understood, aspects and/or embodiments of the present disclosure provide systems, methods, and/or apparatus that can be used with shipping containers that will allow the container to be used as a fumigation container to fumigate the product stored therein, and which will allow for the continued monitoring and then exhaustion of the fumigant.

To complete the fumigation process, the shipping container and product held therein are typically inspected. Once the inspection is completed, injection equipment is positioned at the back of the container and an injection hose is inserted into the container. In the case of log fumigation, prior to the actual injection of the methyl bromide-based fumigant into the container, one of the container doors is closed (typically, the left back door 12A) and the other door (right back door 12B) remains open to accept a vapor barrier 20. As shown in the figures (see, e.g., FIG. 2), the vapor barrier 20 is a triple-walled vapor barrier. The barrier 20 has a body 21 that comprises a ⅝-inch-thick solid plastic sheet and gaskets. However, the thickness of the sheet may vary, and it is to be appreciated that generally ¼-inch to 1-inch thick sheets may be used. The exact thickness of the sheets 22A-C should not be limiting on the invention. The barrier is inserted behind the container's top and right-side door frame, and behind the left-rear door since that door is closed.

Figure 3:
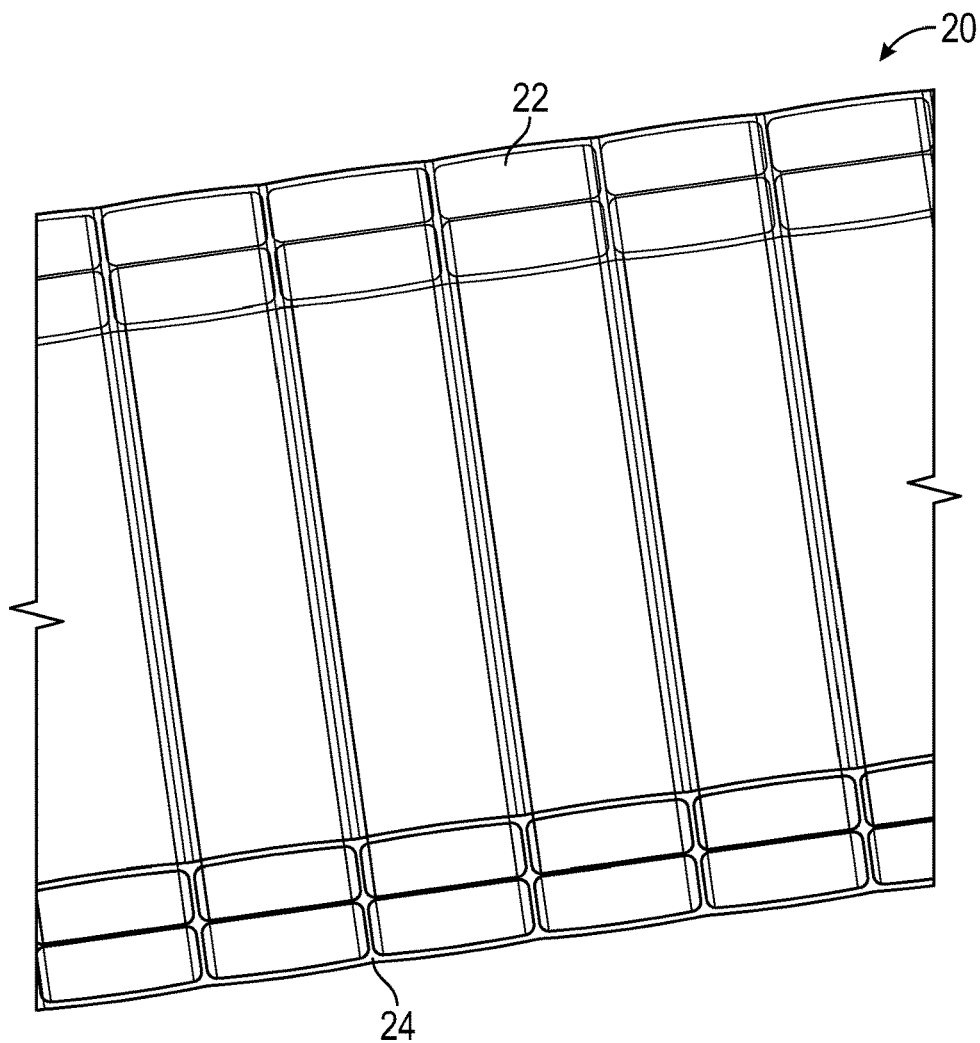
FIG. 3 is a view of a cross-section of the vapor barrier.
Figure 4:
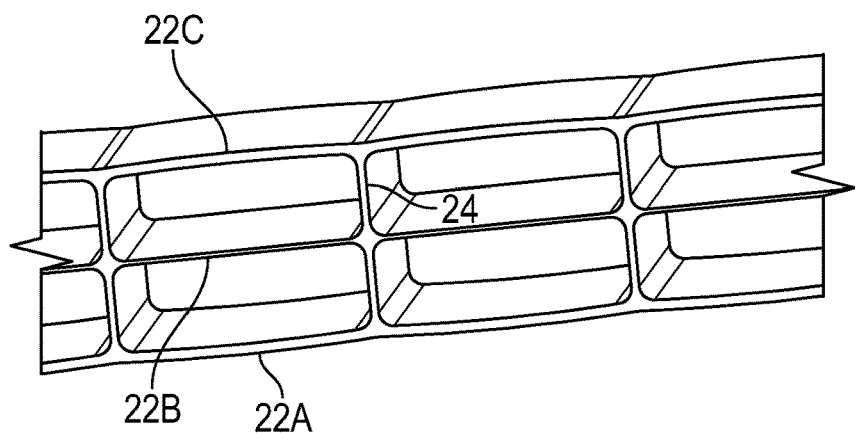
FIG. 4 is a view showing the end of the cross-section of the vapor barrier.
Figure 5:
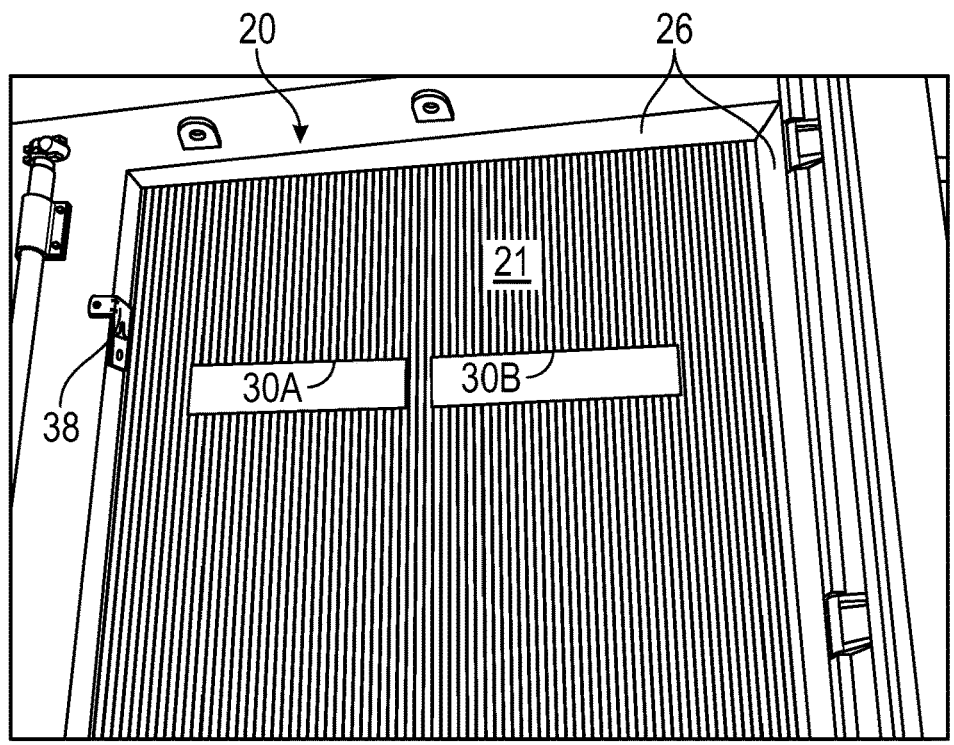
FIG. 5 is a view showing air intake ports of a barrier according to aspects and/or embodiments of the present disclosure.

The vapor barrier's walls 22 are shown in FIGS. 3 and 4, showing the three walls 22A, 22B, and 22C. The wall 22 is comprised of greenhouse glass, which comprises three parallel layers of plexiglass that include a plurality of perpendicular support portions 24, also made of plexiglass. The support member 24 provide spacing for the walls 22A, 22B, and 22C of the barrier 20, and also provide rigidity for the barrier 20. The composition of the plexiglass for the wall 22 of the barrier 20 allows the barrier to be more lightweight than conventional doors that may be used with fumigating containers. The plexiglass also allows for the flexibility and fitting of the barrier into the doorway of the container 10. While plexiglass is provided, it should be appreciated that other types of materials may be used, including other plastics, rubbers, polycarbonates, or the like to provide rigidity, flexibility, and sealing for the container opening. Furthermore, while the plexiglass is transparent, it should be appreciated that the barrier 20 need not be transparent in all embodiments, and some products under fumigation may need to include an opaque wall or walls 22.

Figure 2:
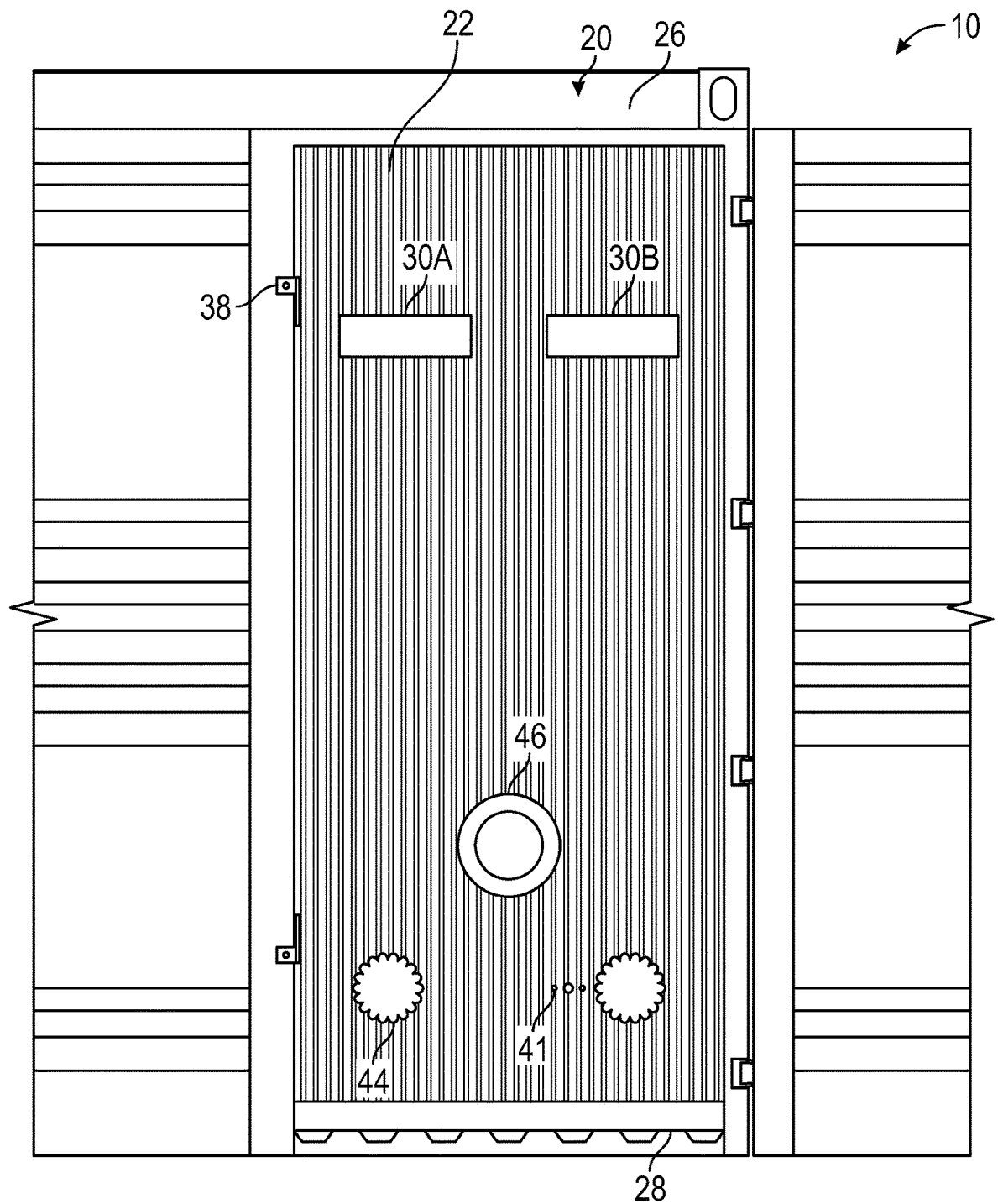
FIG. 2 is a view showing the positioning of a vapor barrier in the doorway of a shipping container, such as that shown in FIG. 1.

As shown in FIG. 2, the barrier's top edge and both vertical edges are equipped with gaskets 26 in the form of a 3-inch-wide rubber gasket material, while the bottom edge is equipped with a rubber brush gasket system 28. A brush gasket utilizes a rubber seal with a brush like member extending therefrom. Using a brush gasket system will mitigate any air gaps formed by container floor irregularities and will create a flush seal.

Figure 6:
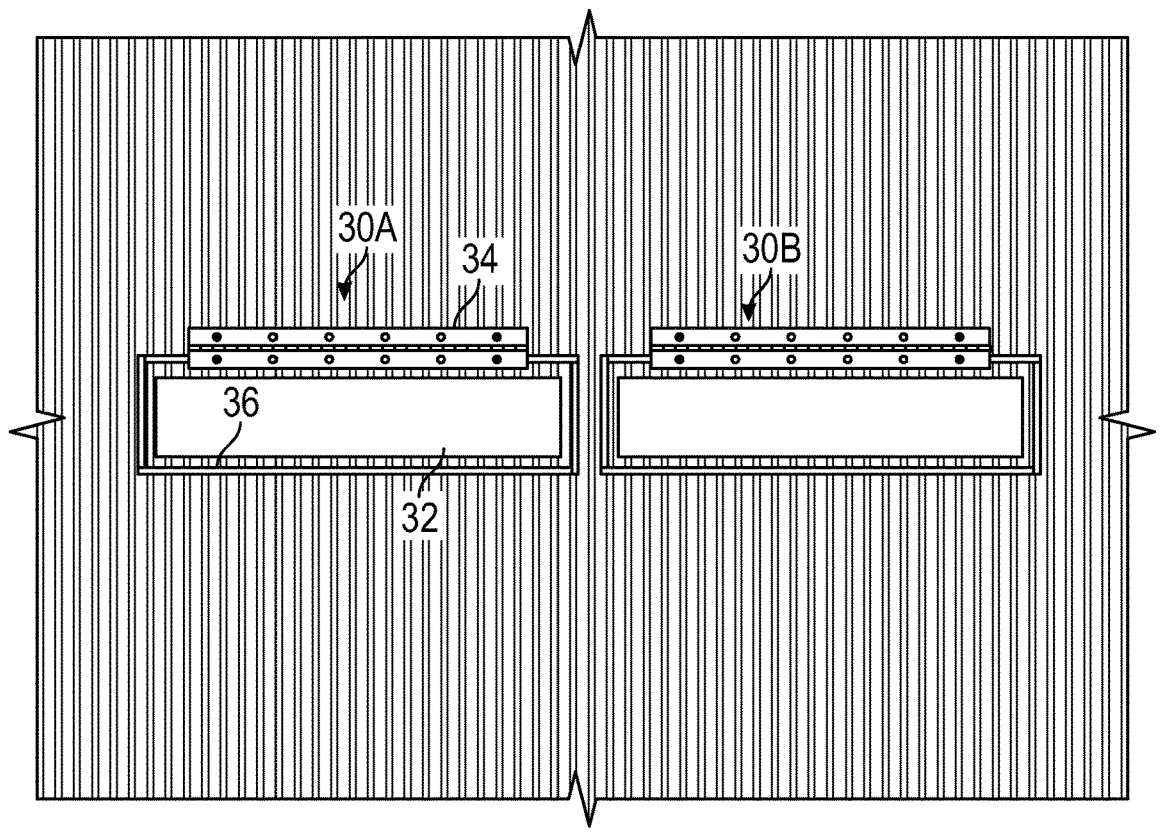
FIG. 6 is a view showing the air intake ports of the barrier in a closed position.
Figure 7:
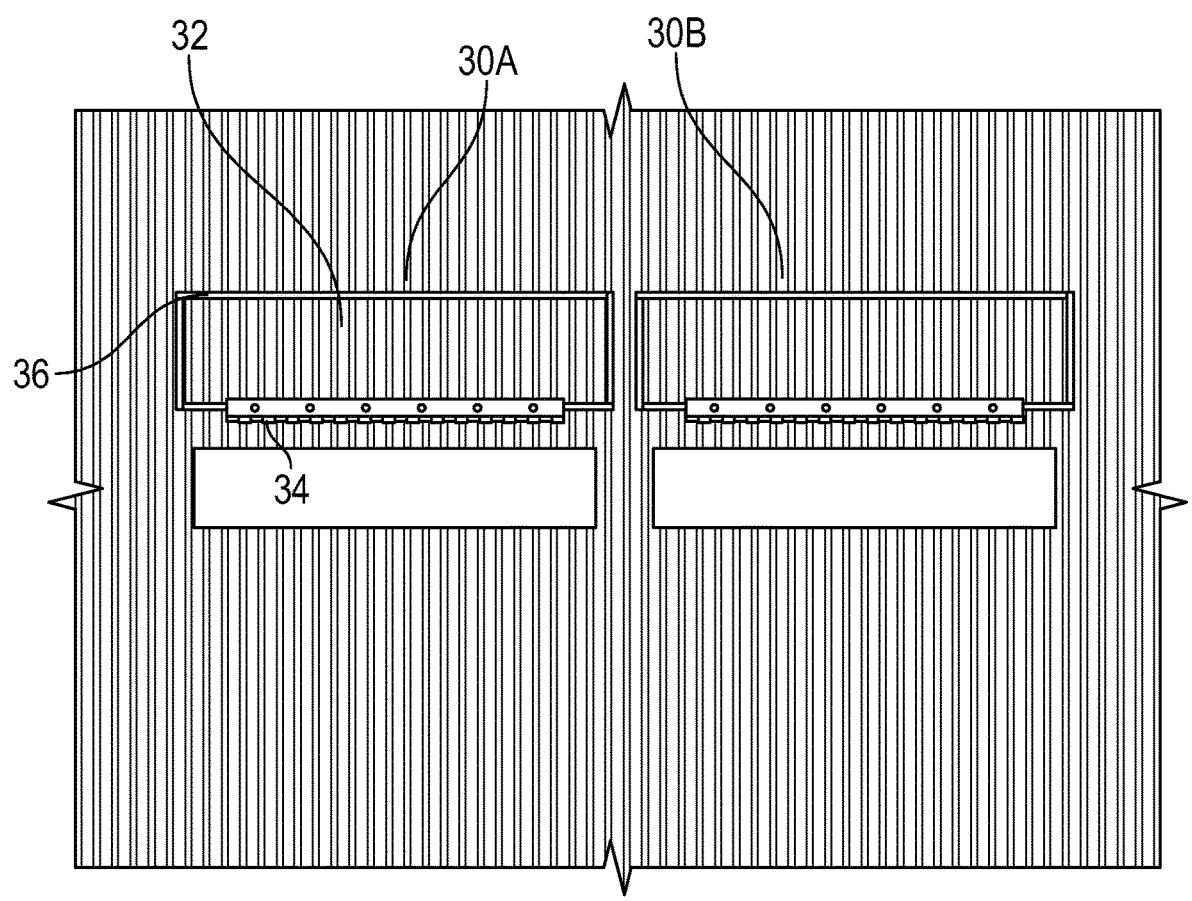
FIG. 7 is a view showing the air intake ports of the barrier in an open position.
Figure 8:
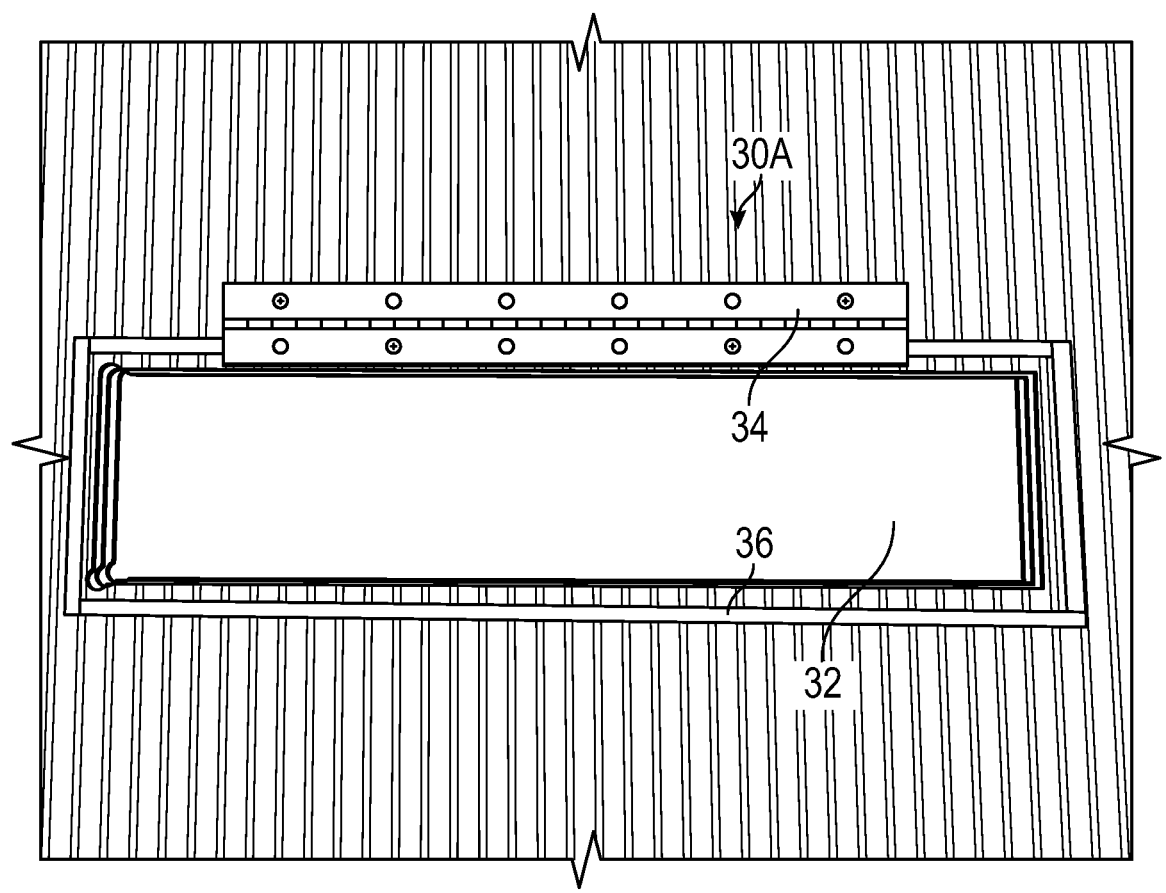
FIG. 8 is an enlarged view showing an air intake port and associated hinge.

According to at least some aspects of some embodiments, one or more one-way fresh-air intake ports 30 will be installed approximately 1-foot below the barrier's top edge. As shown in FIG. 2, there are two one-way fresh-air intake ports 30A and 30B, set substantially horizontally inline, across the barrier's face. Each fresh-air intake port 30A and 30B is rectangle in shape; 4-inches tall and approximately 1.5-feet wide. However, it should be appreciated that the shape and dimension of the ports 30A and 30B may vary according to usage, and thus, the configurations provided herein and shown in the figures should not be construed as limiting on the present disclosure. The ports 30A and 30B are shown in FIGS. 5-8. As shown in the figures, one-way air flow into the container is maintained by using a hinged flap 32 installed on the barrier's interior and connected via a hinge 34. The flaps 32 may be weighted and have rubber gasket material 36 along all the edges to seal between the flap and barrier's interior side. Each flap is taller and wider than their sister opening to affect the one-way air flow and vapor seal. FIGS. 6 and 8 show the flaps 32 in a closed manner, and FIG. 7 shows the flaps in an open manner. The flap may comprise any rubber or plastic material to allow for air into the container, while mitigating the air from leaving the container. As will be understood, the flaps aid in mitigating contraction of the container during the exhaustion of the fumigant, such as via a vacuum or other fan. The fresh air will both move the heavier fumigant towards the lower portion of the container and will provide support for the container.

According to some aspects of some embodiments, the flaps for the air intake ports 30 are plastic flaps. However, according to additional aspects and/or embodiments, the flap can be replaced with a heavier gauged material such as a 1/4" plastic board and connected with a hinge, such as a piano hinge. The flap 32 can be ringed along outside with weather stripping to ensure better seal.

The barrier 20 is attached to a container 10 using side-hooks 38 that lock the barrier 20 into place using the container's frame and the closed left-side door 12A. This is shown in FIG. 2. This method induces an outward tension vector between the container's interior and the barrier's exterior facing gaskets.

Figure 9:
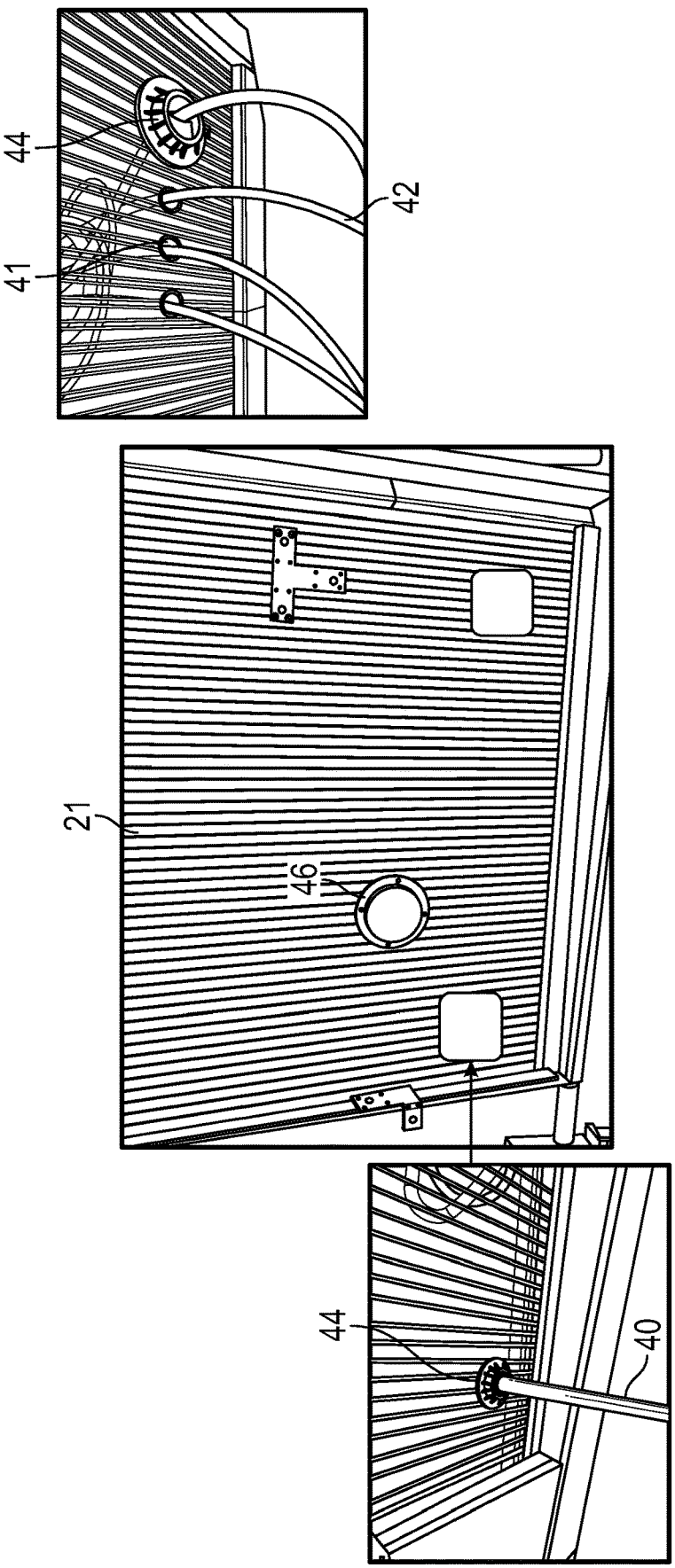
FIG. 9 includes view showing a lower portion of the barrier includes grommets and connection flanges, and also showing lines into the container.

As shown in FIG. 9, product introduction lines 40 and head-space concentration monitoring lines 42 (or other monitoring lines) will pass through the barrier 20 using a nitrile rubber grommet system 44. However, it should be appreciated that any grommet that allows for cables to pass through, while mitigating leakage of an interior gas can be used. The grommet opening is sized to ensure a tight seal between pass-through hosing and the rubber grommet material. The barrier 20 will also have a sealable aeration hose connection flange 46, which will remain closed until aeration begins. As will be understood, the flange 46 allows for a hose connection for the exhaustion or removal of the fumigant from the interior of the container 10 and towards the ambient environment.

Figure 10:
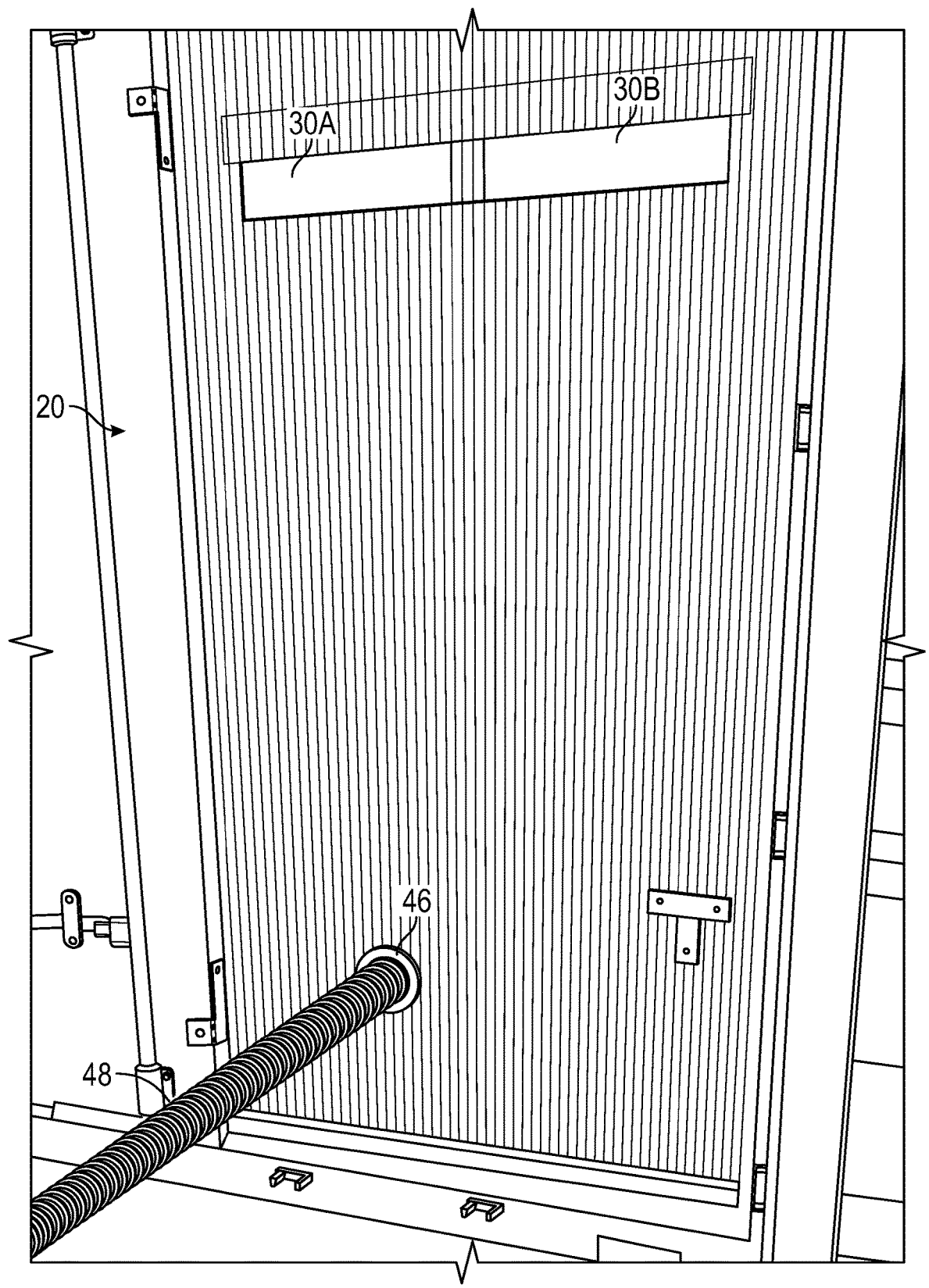
FIG. 10 is a view of a barrier door with an exhaust tubing connected to a flange for removing fumigant from the container.
Figure 11:
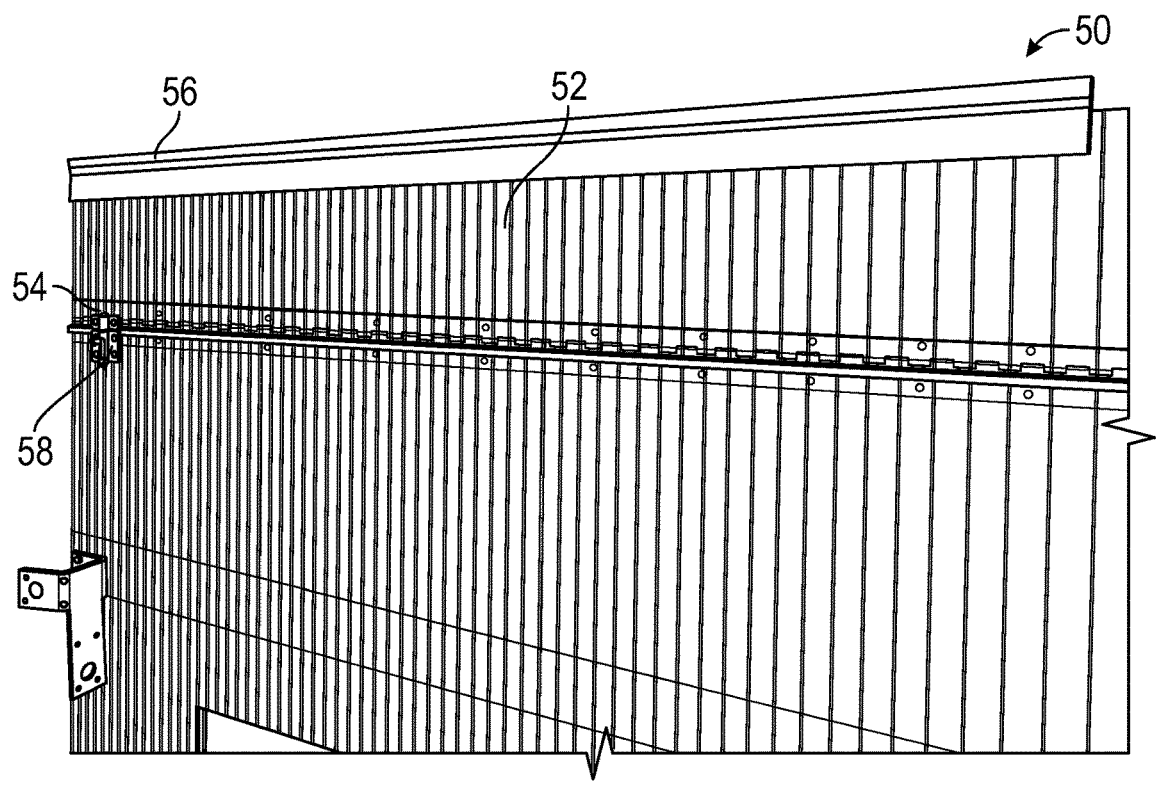
FIG. 11 is a view showing a height adjustment section for a barrier.
Figure 12:
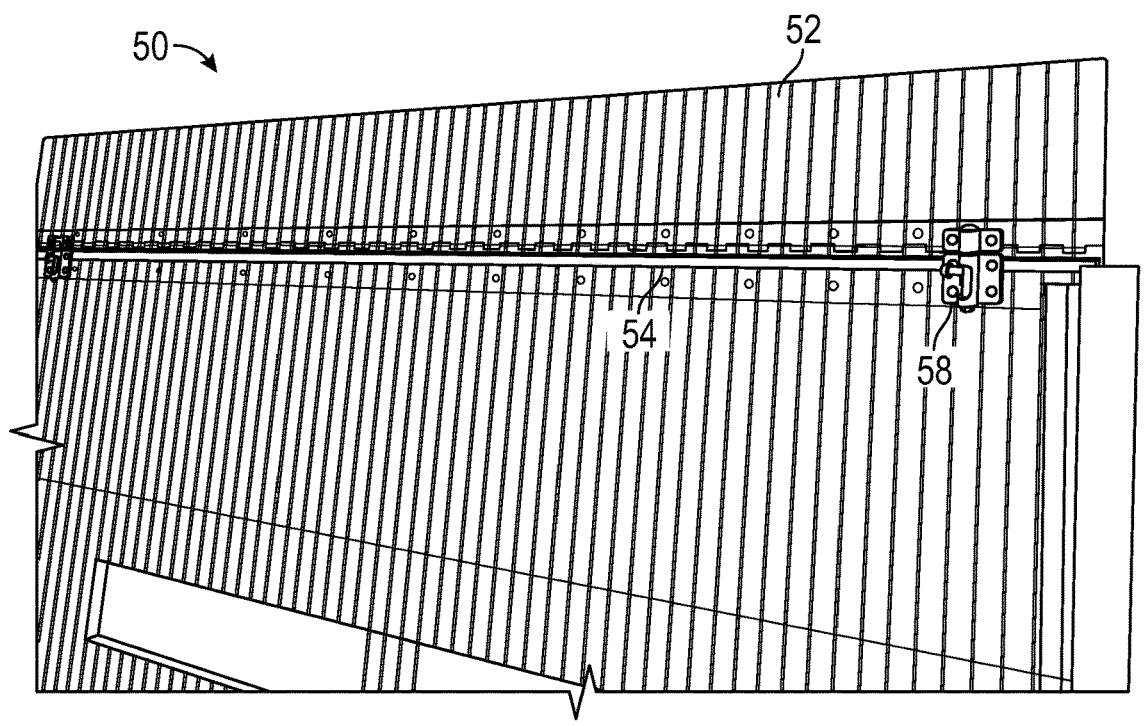
FIG. 12 is another view showing a height adjustment section for a barrier.

A fumigant is introduced to the interior of the shipping container 10 via the introduction line(s) 40, and the lines are left in place for the entire process. See, e.g., FIG. 10, showing a tube connected to the flange 46. Once the exposure period is met, 4" aeration tubing 48 is connected, while a blower is running, to the connection flange 46 for active aeration. This connection process will take less than 10 seconds to complete following flange cover removal. The tubing 48 is operatively connected to a vacuum or other member (e.g., positive pressure via a fan or blower) to actively remove the fumigant from the interior of the shipping container 10 to exhaust the container. For example, the tubing 48 may be connected to a chimney exhaust system, such as that disclosed in U.S. Ser. No. 17/457,487, wherein the fumigant is timely exhausted per rules and/or regulations.

It should be appreciated that the flange 46 and connecting hose/tubing 48 be variable in size, such as to account for the needs of the operation in use. For example, it is envisioned that the flange 46 could be 4-inches to 10-inches, with the tubing 48 either having a connection to adjust for the size or being of substantially equal size to the flange. The exact diameter should not be limiting to the disclosure.

It should be appreciated that the grommets 44 can include seal-gaskets for better fitment or durability. In addition, the connection flange 46 can also be varied. While a 4" tubing was disclosed, it should be appreciated that additional sizes and thus, fittings, could be used. For example, the tubing and connection could be 6- or 8-inches in diameter, such as to meet specifications.

Still referring to FIG. 10, it is noted that the location of the air intake ports 30 and the location of the connection flange 46 provide ideal location for the intake and exhaust of the system. As methyl bromide and other fumigants are generally heavier than air, they will settle at or near the bottom of the shipping container. The intake ports 30 are provided to take advantage of this phenomenon to minimize disruption of the fumigant by the addition of the ambient air. In addition, as the methyl bromide or other fumigant has settled at or near the bottom of the container, the location of the connection flange 46 at or near the lower portion of the barrier 20 also is advantageous. The location of the flange will be adjacent the fumigant, thus requiring less time and pressure required to move the fumigant from the interior of the container 10 to the exhaust location.

Additional advantages and/or improvements of the barrier 20 as provided include the ability to close the door, such as the right door 12B, of the container 10 during fumigation. This is shown in FIG. 17, where both doors 12A and 12B of the container 10 are shown closed with the barrier 20 in place. The barrier 20 fits in the doorway and is thin enough that it will not extend beyond the door frame. The ¼" monitoring lines 42 and the ⅜" gas introduction lines 40 are slipped under the left closed-door 12A gap. The team modifies the metal strip and rubber under the door to ensure the lines can slide under the closed left side door, without pinching them. Lastly the right-side door 12B is closed and both doors locked. This allows both doors 12A and 12B of the container 10 to be closed and locked, which provides safety and mitigation efforts. The locking of the doors will ensure that people do not open the barriers while the fumigant is inside, protecting unwanted and unacceptable exhaustion of the fumigant to the ambient environment.

Additional aspects and/or embodiments of the barrier 20 are shown in FIGS. 11-15. Most shipping containers 10 are either 8-feet, 6-inches, or 9-feet, 6-inches. As shown in FIGS. 11-15, an extension system 50 can be included to facilitate transitioning from a shorter to a taller container 10. The system 50 includes an extension 52, which comprises the same or similar construction as that of the barrier 20 body. This includes the 3-walled plexiglass or like material. The extension 52 is attached to the barrier 20 via a hinge 54, which may be a piano hinge or the link. Piano hinges are longer, which aid in connecting a longer width of the barrier 20 and extension 52.

Figure 13:
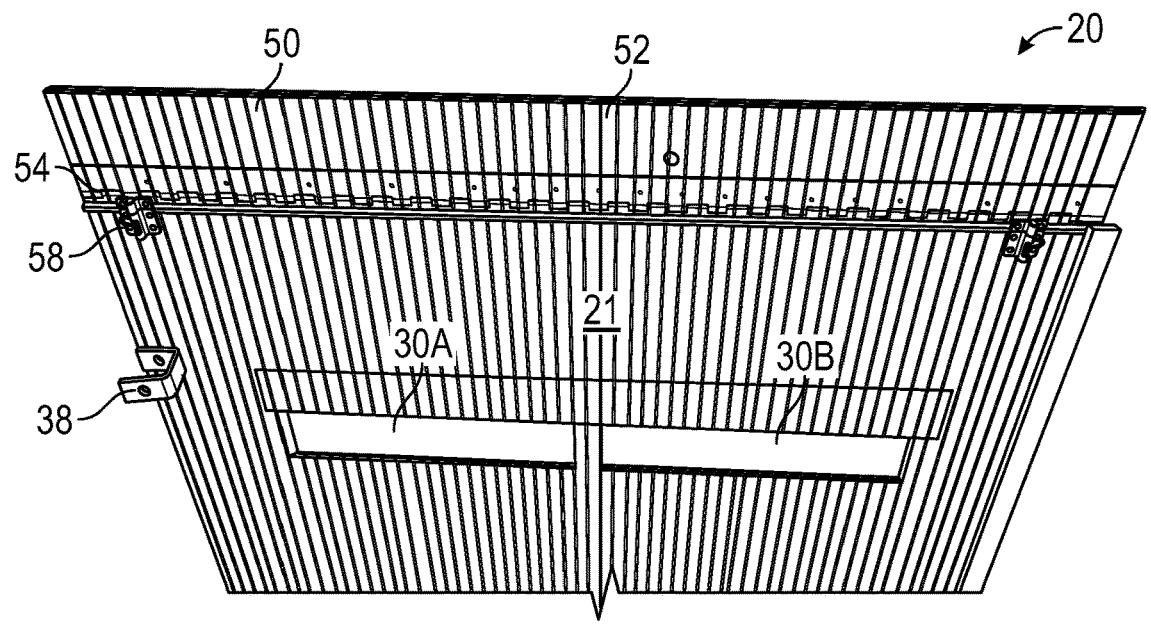
FIG. 13 is still another view another showing a height adjustment section for a barrier.
Figure 14:
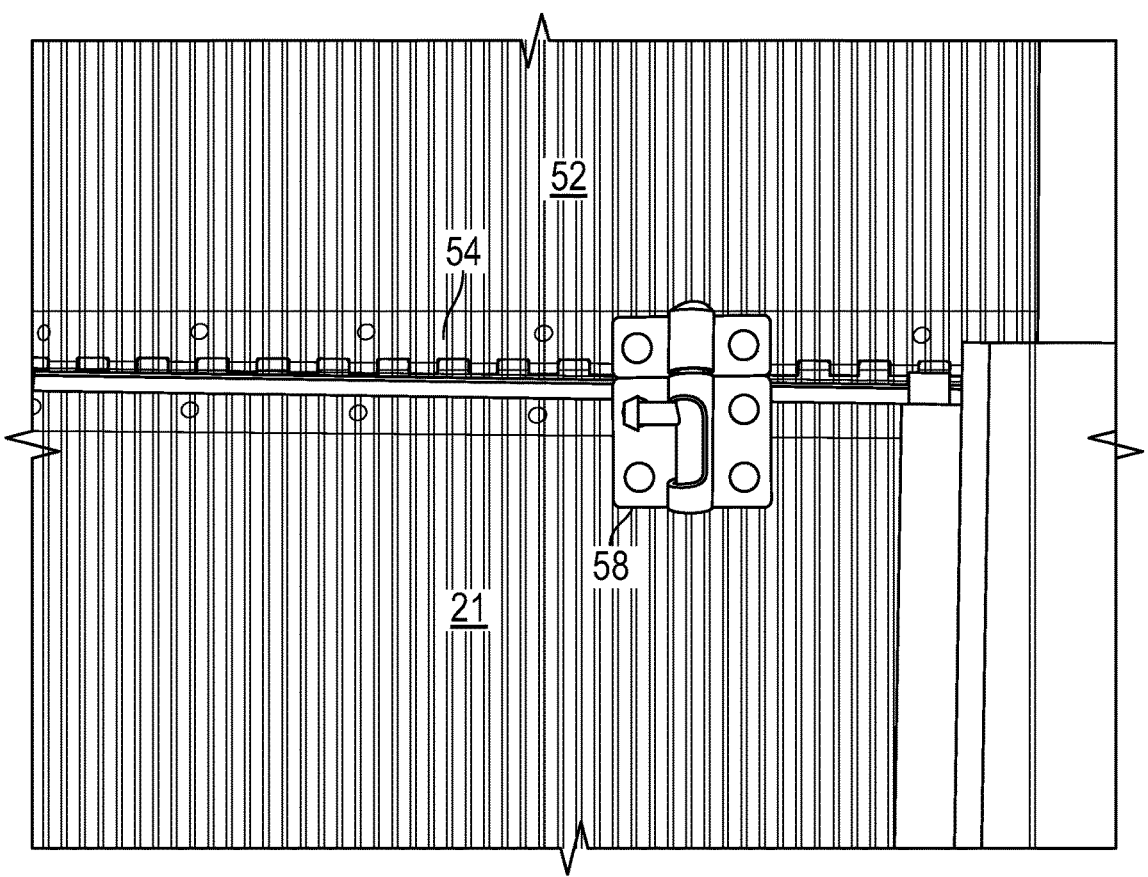
FIG. 14 is a view showing a locking member for engaging the height adjustment section for the barrier.
Figure 15:
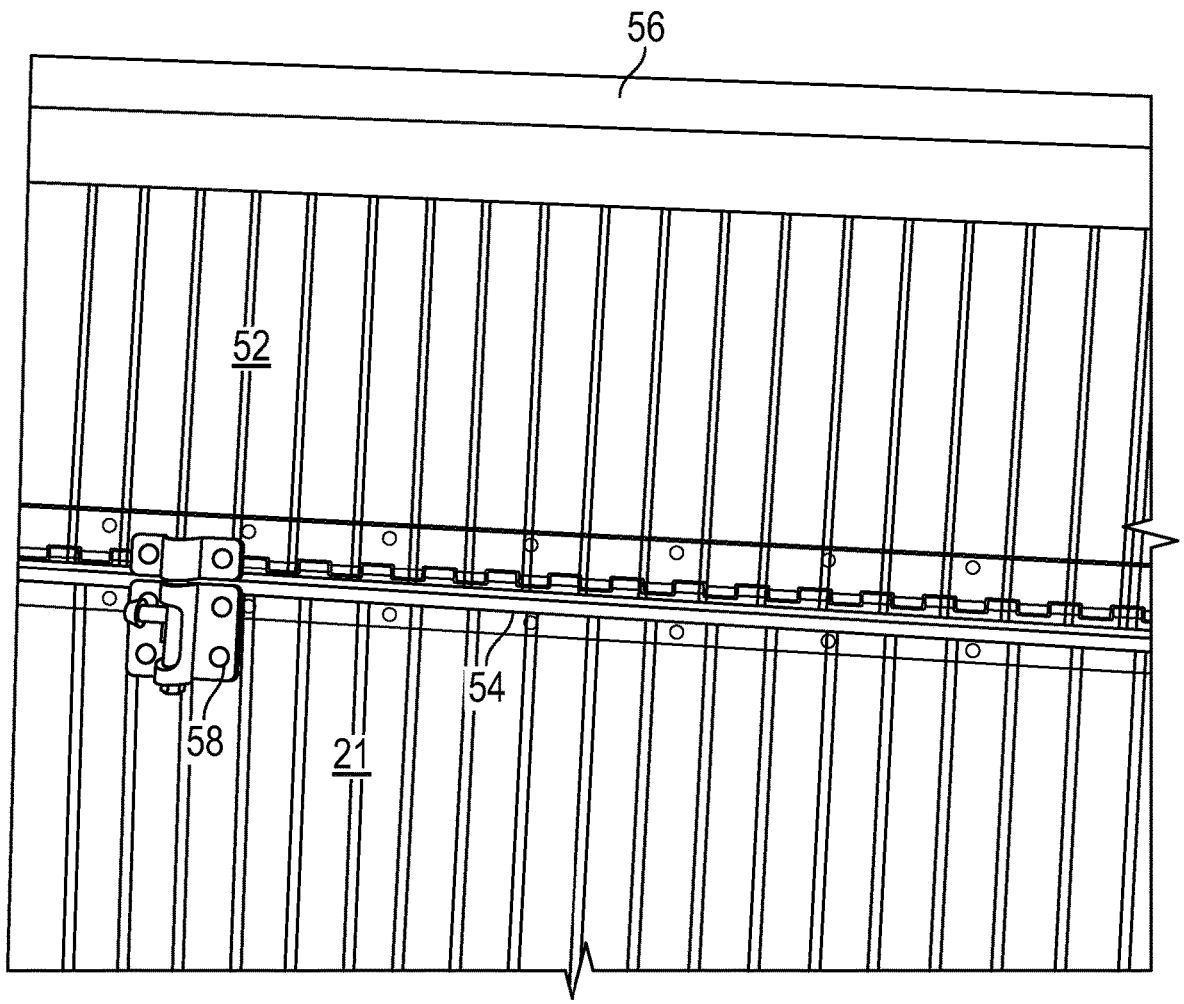
FIG. 15 is a view showing additional aspects of the locking member and height adjustment section for the barrier.
Figure 16:
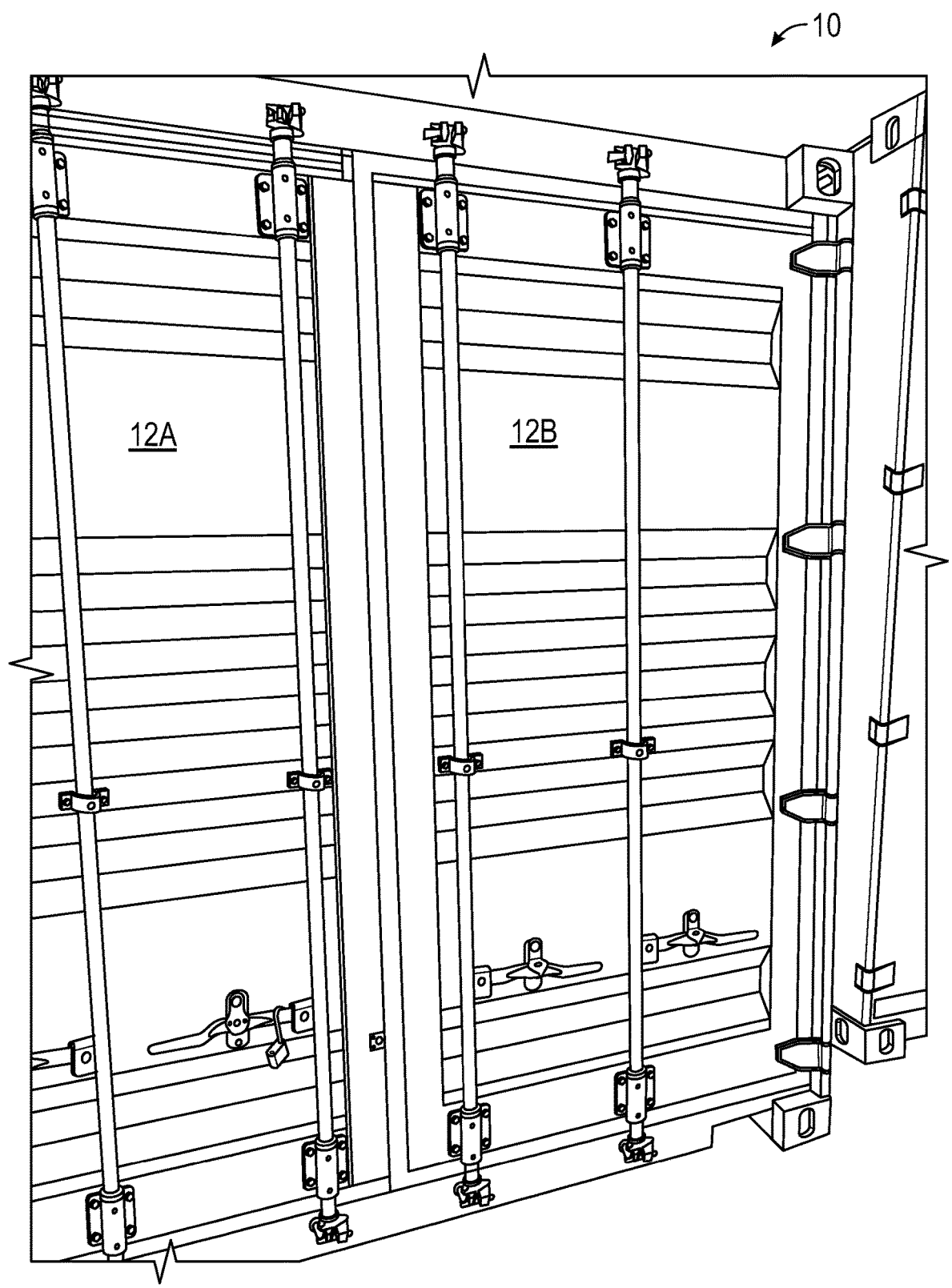
FIG. 16 is a view showing the container closed with the barrier in place for fumigating product in the container.

The hinge 54 may also allow the extension 52 to always be connected to the barrier, and only used when going from a shorter container to a taller one. For example, the extension 52, when not in use, could simply be folded about the hinge and out of the way when not needed. To hold the extension 52 in place and generally in line with the barrier 20 body, one or more locking members 58 are shown to be included with the extension system 50. As shown in FIG. 13, two locking members (enlarged views shown in FIGS. 14 and 15) generally on opposite sides of the hinged connection. The locking members 58 include a first portion connected to the barrier 20, and a second portion connected to the extension 52. A sliding member can engage the first and second portions, which will aid in holding the extension along the longitudinal length of the barrier and extension. The locking member can then be locked in place to hold the engagement of the portions, thus creating the taller barrier 20 for use in the taller doorway of the container 10.

Additional aspects of the extension system include a seal 56, which comprises a gasket. The gasket is positioned around the outer portions oft the extension system 50 to seal the extension similar to the barrier 20.

Therefore, a lightweight barrier insert door for shipping container fumigations has been shown and described. The insert barrier 20 attaches within the container's rear, right side of double doors, door opening and forms a seal with the surrounding frame. The insert barrier is meant to allow fumigation tubing and cords to pass through a sealed barrier from the exterior to interior. It also facilitates the attachment of blower vent duct to remove interior air and fumigant when the treatment exposure period ends. The purpose of the insert barrier is to mitigate fumigant loss from the container during all fumigation phases (treatment and aeration).

From the foregoing, it can be seen that the invention accomplishes at least all of the stated objectives. It is to be appreciated that numerous alternatives, variations, and/or changes could be made that are within the scope of the present disclosure. This includes sizes, shapes, and materials, and may be driven by rules and regulations, as well as the shapes and/or configurations of the shipping container or other enclosures used to hold a product being fumigated.

The invention claimed is:

1. A barrier insert for use with a container used for fumigation of a product held inside, the barrier insert comprising:
   a barrier insert body;
   at least one air intake port at an upper position of the barrier insert body, said air intake port comprising a one-way flap to allow air to enter into the container via the port;
   at least one grommet for allowing the entry of one or more lines into the container; and
   a connection flange for connecting an exhaust tube to the barrier insert;
   wherein the barrier insert body is rigid.

2. The barrier insert of claim 1, further comprising a seal around the edges of the barrier insert body.

3. The barrier insert of claim 2, wherein the seal comprises a gasket.

4. The barrier insert of claim 1, further comprising a plurality of side hooks for attaching the insert to the container.

5. The barrier insert of claim 1, wherein the flap of the at least one air intake port is connected to the barrier insert body via a hinge.

6. The barrier insert of claim 5, wherein the flap comprises the same material as the barrier insert body.

7. The barrier insert of claim 1, wherein the barrier insert body comprises a plexiglass, three-walled construction.

8. The barrier insert of claim 7, wherein the three-walled construction comprises three plexiglass walls spaced apart via support members transverse to the walls.

9. The barrier insert of claim 1, further comprising an extension system connected to the barrier insert body to adjust the height of the barrier insert.

10. The barrier insert of claim 9, wherein the extension system comprises an extension connected to the barrier insert body via a hinge and held in longitudinal configuration by one or more locking members.

11. A barrier system for use fumigating a product in a shipping container, the system comprising:
- a barrier insert comprising a barrier insert body, at least one air intake port at an upper position of the barrier insert body, said air intake port comprising a one-way flap to allow air to enter into the container via the port;
- a fumigant introduction line grommet through the barrier insert body to receive a fumigant introduction line for adding fumigant to the container;
- a connection flange for connecting an exhaust tube to the barrier insert; and
- an extension system connected to the barrier insert body to adjust the height of the barrier insert;
- wherein the extension system comprises an extension connected to the barrier insert body via a hinge and held in longitudinal configuration by one or more locking members.

12. The barrier system of claim 11, further comprising at least one monitoring line grommet to receive a monitoring line through the barrier insert.

13. The barrier system of claim 11, further comprising one or more side hooks for connecting the barrier insert to a doorway of the shipping container.

14. The barrier system of claim 11, wherein the barrier insert includes a gasket around a top and a first and second side edge of the barrier insert body.

15. The barrier system of claim 14, further comprising a rubber brush gasket at a bottom of the barrier insert body.

16. A barrier insert door, comprising:
- a barrier insert body comprising a three-walled construction, said barrier insert body including a gasket around a top, a first, and second side edge, and a rubber brush gasket along a bottom;
- at least one air intake port at an upper position of the barrier insert body, said air intake port comprising a one-way flap to allow air to enter into the container via the port; and
- an extension system connected to the barrier insert body to adjust the height of the barrier insert.

17. The barrier insert door of claim 16, wherein the extension system comprises an extension connected to the barrier insert body via a hinge and held in longitudinal configuration by one or more locking members.

18. The barrier insert door of claim 16, further comprising one or more grommets for allowing one or more lines to pass through the barrier insert body, and a connection flange for connecting an exhaust conduit to the barrier insert door.

* * * * *